(12) United States Patent
Yang (10) Patent No.: US 11,835,542 B2
(45) Date of Patent: Dec. 5, 2023

(54) APPARATUS FOR MEASURING SPEED OF VEHICLE HAVING IN-WHEEL MOTOR

(71) Applicant: Hyundai Mobis Co., Ltd., Seoul (KR)

(72) Inventor: Hae Jun Yang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1029 days.

(21) Appl. No.: 16/542,357

(22) Filed: Aug. 16, 2019

(65) Prior Publication Data

US 2020/0057089 A1 Feb. 20, 2020

(30) Foreign Application Priority Data

Aug. 16, 2018 (KR) .................. 10-2018-0095401

(51) Int. Cl.
| | |
|---|---|
| *B60B 27/00* | (2006.01) |
| *B60K 7/00* | (2006.01) |
| *G01P 3/44* | (2006.01) |
| *B60B 23/06* | (2006.01) |
| *B60B 27/06* | (2006.01) |
| *F16B 39/12* | (2006.01) |

(52) U.S. Cl.
CPC .............. *G01P 3/443* (2013.01); *B60B 23/06* (2013.01); *B60B 27/0068* (2013.01); *B60B 27/065* (2013.01); *B60K 7/0007* (2013.01); *F16B 39/12* (2013.01); *B60K 2007/0092* (2013.01)

(58) Field of Classification Search
CPC . B60B 27/0068; B60B 27/065; B60K 7/0007; B60K 2007/0092; G01P 3/443
See application file for complete search history.

(56) References Cited

U.S. PATENT DOCUMENTS

| | | | |
|---|---|---|---|
| 4,037,690 A * | 7/1977 | Fisher .................... | G01P 3/488 |
| | | | 310/168 |
| 5,438,260 A * | 8/1995 | Rigaux .................. | G01P 3/443 |
| | | | 348/448 |
| 2012/0132473 A1* | 5/2012 | Weber ................. | B60K 7/0007 |
| | | | 29/897 |
| 2016/0355084 A1* | 12/2016 | Uozumi ................ | H02K 7/006 |
| 2022/0016928 A1* | 1/2022 | Shin ...................... | B60K 7/0007 |

(Continued)

FOREIGN PATENT DOCUMENTS

| | | | |
|---|---|---|---|
| JP | 2017-159704 | 9/2017 | |
| KR | 10-2016-0056633 | 5/2016 | |
| WO | WO-0145990 A1 * | 6/2001 | ............. B60T 17/22 |

OTHER PUBLICATIONS

Office Action dated Jan. 3, 2022 for Korean Patent Application No. 10-2020-0093767.

(Continued)

*Primary Examiner* — Erick R Solis
(74) *Attorney, Agent, or Firm* — H.C. Park & Associates, PLC (57) ABSTRACT

An apparatus for measuring a speed of a vehicle having an in-wheel motor includes a lock nut part fixed to an outer portion of a rotation shaft rotated by receiving power of the in-wheel motor, and restricting movement of a bearing part positioned outside the rotation shaft; a connection part coupled to the lock nut part; a magnet part having a magnetic force, and fixed to the connection part; and a speed sensor part installed to be separated from the magnet part, and measuring rotations of the magnet part.

10 Claims, 7 Drawing Sheets

(56) References Cited

U.S. PATENT DOCUMENTS

2022/0194233 A1* 6/2022 Reuter ................. B60K 7/0007
2023/0094579 A1* 3/2023 Yada ........................ B60K 6/26
                                                              180/65.51

OTHER PUBLICATIONS

Non-Final Office Action dated Jun. 26, 2023, in U.S. Appl. No. 17/463,411.
Notice of Allowance dated Oct. 18, 2023, in U.S. Appl. No. 17/463,411.

* cited by examiner

APPARATUS FOR MEASURING SPEED OF VEHICLE HAVING IN-WHEEL MOTOR

CROSS-REFERENCE TO RELATED APPLICATION

The present application claims priority under 35 U.S.C. § 119(a) to Korean Patent Application No. 10-2018-0095401 filed on Aug. 16, 2018 in the Korean Intellectual Property Office, which is incorporated herein by reference in its entirety.

BACKGROUND

Field

Embodiments of the present disclosure relate to an apparatus for measuring a speed of a vehicle having an in-wheel motor, and more particularly, to an apparatus for measuring a speed of a vehicle having an in-wheel motor, which can increase the degree of freedom of design of a vehicle by measuring a rotation speed of a lock nut rotated by receiving power of an in-wheel motor.

In general, an in-wheel driving device is a technology used in a vehicle such as an electric vehicle, which uses electricity as a power source. Unlike a gasoline or diesel vehicle adopting a system in which wheels are rotationally driven by power transfer through an engine, a transmission and a drive shaft, the in-wheel driving device is a technology where power is directly transferred to wheels by motors which are disposed in left and right drive wheels or four left and right and front and rear drive wheels.

An apparatus for sensing a speed may be provided to a vehicle having an in-wheel motor, and may operate in cooperation with an ABS (anti-lock brake system) and an ESC (electronic stability control) system for a vehicle.

The ABS for a vehicle is a kind of safety device which detects a speed change of a rotating wheel upon sudden braking and thereby prevents the wheel of the vehicle from being locked. Also, the ESC system for a vehicle is a device which controls a braking hydraulic pressure for four wheels by sensing a vehicle speed, a steering angle, a lateral acceleration, a yaw rate, etc. and controls the posture of a vehicle by preventing a tilting phenomenon of the vehicle upon cornering.

In the conventional art, there is used an apparatus which senses a vehicle speed by forming a plurality of prominences and depressions on a circumferential outer surface of a gear rotated by receiving power of a motor and by installing a sensor for sensing the level difference of the prominences and depressions, outside the gear.

In the conventional art, since the apparatus for sensing a wheel speed of a vehicle is installed on a hub bearing and thus a separate seal part for preventing leakage of oil is added, a problem is caused in that the number of work processes is increased. Moreover, because an installation space for a product to sense the shapes of the prominences and depressions formed on the circumferential outer surface of the gear is increased, an interference phenomenon with other parts is highly likely to occur. Therefore, there is a need for solving the problem.

SUMMARY

Various embodiments are directed to an apparatus for measuring a speed of a vehicle having an in-wheel motor, which can increase the degree of freedom of design of a vehicle by measuring a rotation speed of a lock nut rotated by receiving power of an in-wheel motor.

In an embodiment, an apparatus for measuring a speed of a vehicle having an in-wheel motor may include: a lock nut part fixed to an outer portion of a rotation shaft rotated by receiving power of the in-wheel motor, and restricting movement of a bearing part positioned outside the rotation shaft; a connection part coupled to the lock nut part; a magnet part having a magnetic force, and fixed to the connection part; and a speed sensor part installed to be separated from the magnet part, and measuring rotations of the magnet part.

The connection part may have a ring shape which surrounds an outside of the lock nut part, and may be coupled to the lock nut part by press fitting.

The connection part may be coupled to the lock nut part after the connection part and the magnet part are coupled first.

The magnet part may be formed by sintering powder having a magnetic force, and may be bonded to the connection part.

In an embodiment, an apparatus for measuring a speed of a vehicle having an in-wheel motor may include: a lock nut part fixed to an outer portion of a rotation shaft rotated by receiving power of the in-wheel motor, and restricting movement of a bearing part positioned outside the rotation shaft; a magnet part having a magnetic force, and fixed to the lock nut part; and a speed sensor part installed to be separated from the magnet part, and measuring rotations of the magnet part.

The magnet part may be formed by sintering powder having a magnetic force, and may be bonded to an outside of the lock nut part.

The magnet part may include a magnet body facing an upper surface of the lock nut part, and extending in a ring shape; and engagement projections extending from the magnet body, and inserted into engagement grooves which are defined in the lock nut part.

In an embodiment, an apparatus for measuring a speed of a vehicle having an in-wheel motor may include: a lock nut part fixed to an outer portion of a rotation shaft rotated by receiving power of the in-wheel motor, and restricting movement of a bearing part positioned outside the rotation shaft; and a speed sensor part installed to be separated from the lock nut part, and measuring rotations of the lock nut part.

The lock nut part may include a lock nut body locked to the outer portion of the rotation shaft, and having a ring shape; and outer projections projecting on a circumferential outer surface of the lock nut body in shapes of prominences and depressions, and measured by the speed sensor part.

The lock nut part may further include engagement grooves which form groove portions between the outer projections.

According to the embodiments, in the apparatus for measuring a speed of a vehicle having an in-wheel motor, since a magnet part is installed on a lock nut part rotated by receiving power of an in-wheel motor, the position of a measurement part may be variously changed, whereby the degree of freedom of design may be increased.

Also, in the embodiments, since a speed of a vehicle may be calculated by measuring rotations of a lock nut part without using a separate magnet part, the number of parts may be decreased, whereby the productivity may be improved.

DETAILED DESCRIPTION OF THE ILLUSTRATED EMBODIMENTS

Hereinbelow, an apparatus for measuring a speed of a vehicle having an in-wheel motor in accordance with embodiments of the disclosure will be described with reference to attached drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
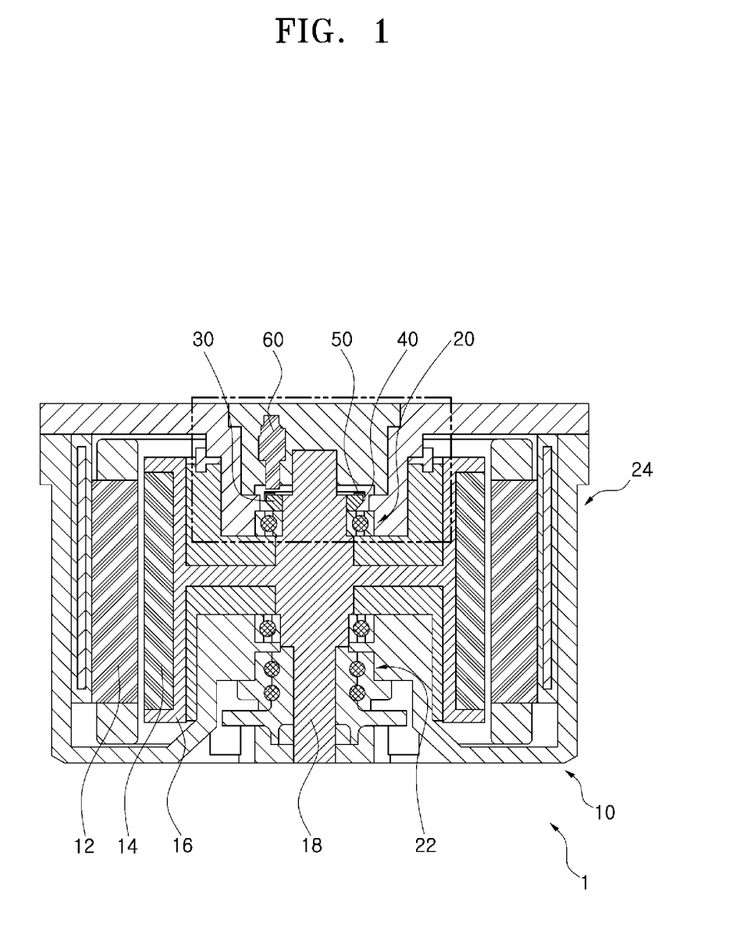
FIG. 1 is a cross-sectional view schematically illustrating the structure of an apparatus for measuring a speed of a vehicle having an in-wheel motor in accordance with an embodiment.
Figure 2:
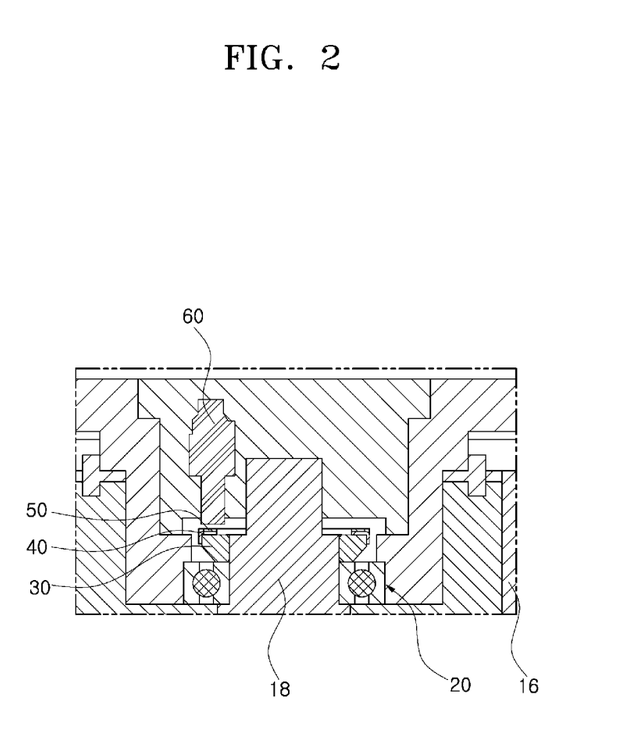
FIG. 2 is a cross-sectional view illustrating a state in which a magnet part and a speed sensor part are installed in accordance with the embodiment.
Figure 3:
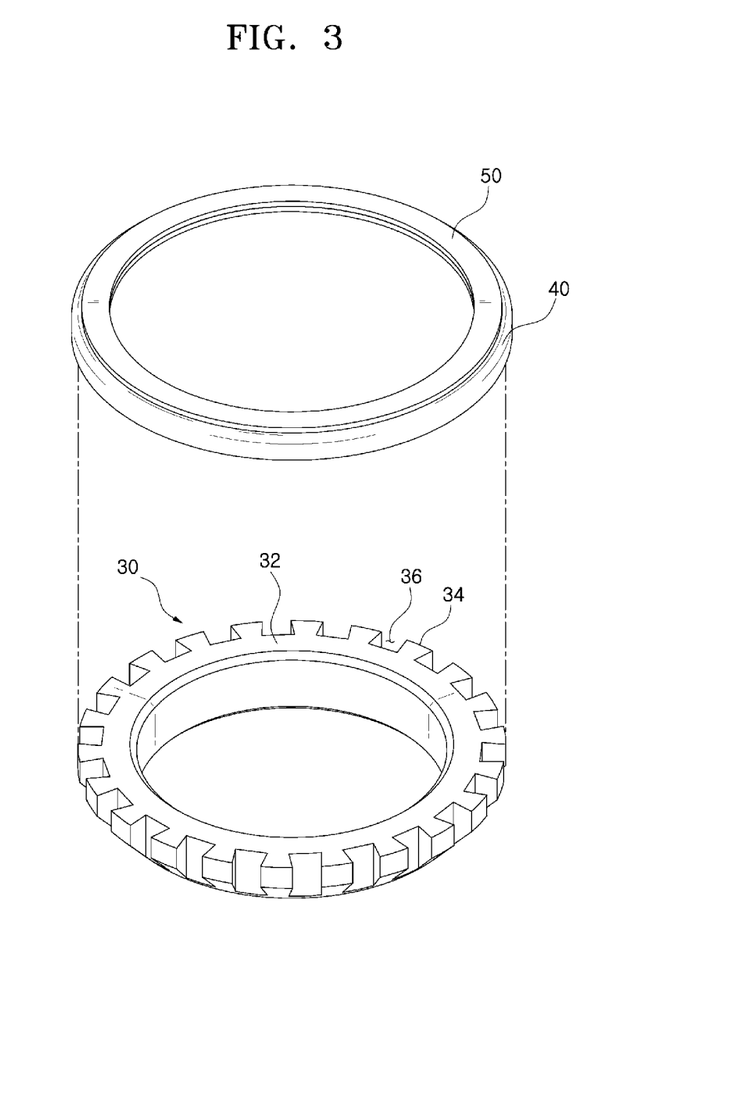
FIG. 3 is a perspective view illustrating a state in which a connection part and the magnet part are decoupled from a lock nut part in accordance with the embodiment.
Figure 4:
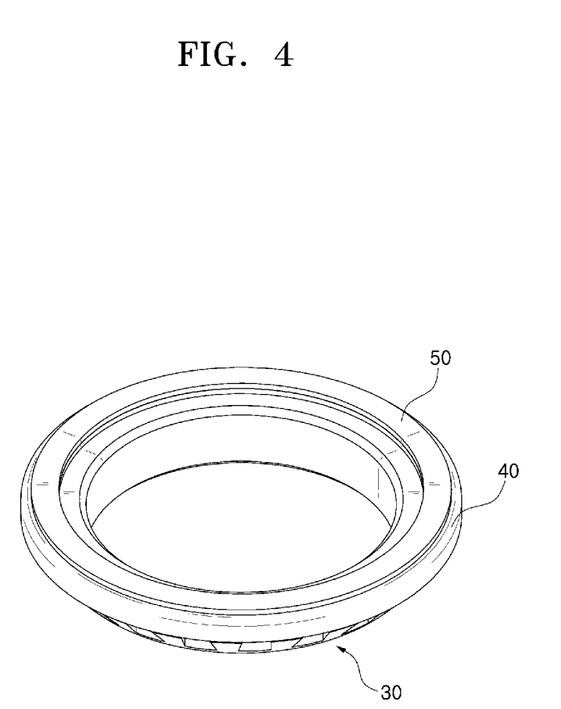
FIG. 4 is a perspective view illustrating a state in which the connection part and the magnet part are coupled to the lock nut part in accordance with the embodiment.

FIG. 1 is a cross-sectional view schematically illustrating the structure of an apparatus for measuring a speed of a vehicle having an in-wheel motor in accordance with an embodiment, FIG. 2 is a cross-sectional view illustrating a state in which a magnet part and a speed sensor part are installed in accordance with the embodiment, FIG. 3 is a perspective view illustrating a state in which a connection part and the magnet part are decoupled from a lock nut part in accordance with the embodiment, and FIG. 4 is a perspective view illustrating a state in which the connection part and the magnet part are coupled to the lock nut part in accordance with the embodiment.

As illustrated in FIGS. 1 to 4, an apparatus 1 for measuring a speed of a vehicle having an in-wheel motor in accordance with an embodiment includes a lock nut part 30 which is fixed to an outer portion of a rotation shaft 18 rotated by receiving power of an in-wheel motor 10 and restricts the movement of a bearing part 20 positioned outside the rotation shaft 18, a connection part 40 which is coupled to the lock nut part 30 and is formed of a material containing iron, a magnet part 50 which has a magnetic force and is fixed to the connection part 40, and a speed sensor part 60 which is installed to be separated from the magnet part 50 and measures the rotations of the magnet part 50.

As the in-wheel motor 10, various kinds of motors may be used without departing from a technical idea of supplying power for rotating a wheel member (not illustrated) of a vehicle. A frame part 24 which forms an outer shape of the in-wheel motor 10 is installed to face the inside of the vehicle.

A stator 12 is fixedly installed inside the frame part 24 of the in-wheel motor 10, and a rotor 14 is rotatably installed at a position facing the stator 12. The rotor 14 is received in a support member 16. Since the support member 16 is connected to the rotation shaft 18, the support member 16 and the rotation shaft 18 are rotated together. The frame part 24 forms the case of the in-wheel motor 10, and is constructed by a plurality of members.

The bearing part 20 and a hub bearing 22 are installed on outer portions of the rotation shaft 18 and guide the rotation of the rotation shaft 18. Since the lock nut part 30 is locked to the outer portion of the rotation shaft 18, a phenomenon in which the bearing part 20 is released upwardly out of the rotation shaft 18 is prevented.

Radial and axial loads as loads due to an external lateral force are simultaneously applied to the in-wheel motor 10. The bearing part 20 which is installed on the outer portion of the rotation shaft 18 needs a fixed structure to endure such a load condition. To this end, the lock nut part 30 is installed on the outer portion of the rotation shaft 18, supports the bearing part 20 and applies a preload. In the embodiment of the disclosure, an encoder for sensing a vehicle speed is applied to the lock nut part 30.

The lock nut part 30 is fixed to the outer portion of the rotation shaft 18 which is rotated by receiving the power of the in-wheel motor 10, and may be realized into various shapes without departing from a technical idea of restricting the movement of the bearing part 20 positioned outside the rotation shaft 18.

The lock nut part 30 includes a lock nut body 32 which is locked to the outer portion of the rotation shaft 18 and has a ring shape, outer projections 34 which project on the circumferential outer surface of the lock nut body 32 and define shapes of prominences and depressions, and engagement grooves 36 which form groove portions between the outer projections 34. The lock nut part 30 in accordance with the embodiment may include only the lock nut body 32, and, as the occasion demands, the outer projections 34 and the engagement grooves 36 may be additionally formed.

The lock nut part 30 may be installed in a direct connection scheme in which the power of the in-wheel motor 10 directly rotates the wheel member through the rotation shaft 18, and may also be installed in an indirection connection scheme in which the power of the in-wheel motor 10 is shifted through a separate reduction gear and thereby rotates the wheel member.

The connection part 40 is coupled to the lock nut part 30, and has various shapes without departing from a technical idea in which it is formed of a material containing iron. The connection part 40 in accordance with the embodiment has a ring shape which surrounds the outside of the lock nut part 30, and is coupled to the lock nut part 30 by press fitting.

The magnet part 50 has a magnetic force, and is fixed to the connection part 40, thereby forming the encoder. Since the connection part 40 is coupled to the lock nut part 30 after the connection part 40 and the magnet part 50 are coupled first and thereby form a module, an assembling process may be simplified and the productivity may be improved.

In a state in which the magnet part 50 as a single member is fixed to the upper portion of the connection part 40, the lower portion of the connection part 40 is fixed by being press-fitted around the upper portion of the lock nut part 30. Further, since the magnet part 50 is formed by sintering powder having a magnetic force and is bonded to the connection part 40, a production process may be shortened.

The speed sensor part 60 is installed in a state in which it is separated from the magnet part 50. The speed sensor part 60 measures the rotations of the magnet part 50 having a magnetic force and sends a measurement value to a control unit, and the control unit measures a speed of the vehicle based on the measurement value of the speed sensor part 60.

Hereunder, an operation state of the apparatus 1 for measuring a speed of a vehicle having an in-wheel motor in accordance with the embodiment will be described in detail with reference to attached drawings.

The rotor 14 is rotated by the magnetic flux change of the stator 12, and the support member 16 and the rotation shaft 18 which are connected to the rotor 14 are rotated together. The support member 16 and the rotation shaft 18 may be integrally formed. The rotor 14, the support member 16 and the rotation shaft 18 constitute a rotor module, and thereby, are integrally rotated.

The lock nut part 30 fixed to the outer portion of the rotation shaft 18 is also rotated together with the rotation shaft 18, and the connection part 40 fixed to the lock nut part 30 and the encoder comprised of the magnet part 50 are also rotated together.

As the speed sensor part 60 which is installed at a position facing the magnet part 50 measures the rotations of the magnet part 50 and sends a measurement value to the control unit, a speed of the vehicle may be easily and quickly measured.

Hereafter, an apparatus 3 for measuring a speed of a vehicle having an in-wheel motor in accordance with another embodiment of the disclosure will be described with reference to drawings.

For the sake of convenience in explanation, the same reference numerals will be used for components of which the constructions and functions are the same as those of the aforementioned embodiment, and detailed descriptions thereof will be omitted herein.

Figure 5:
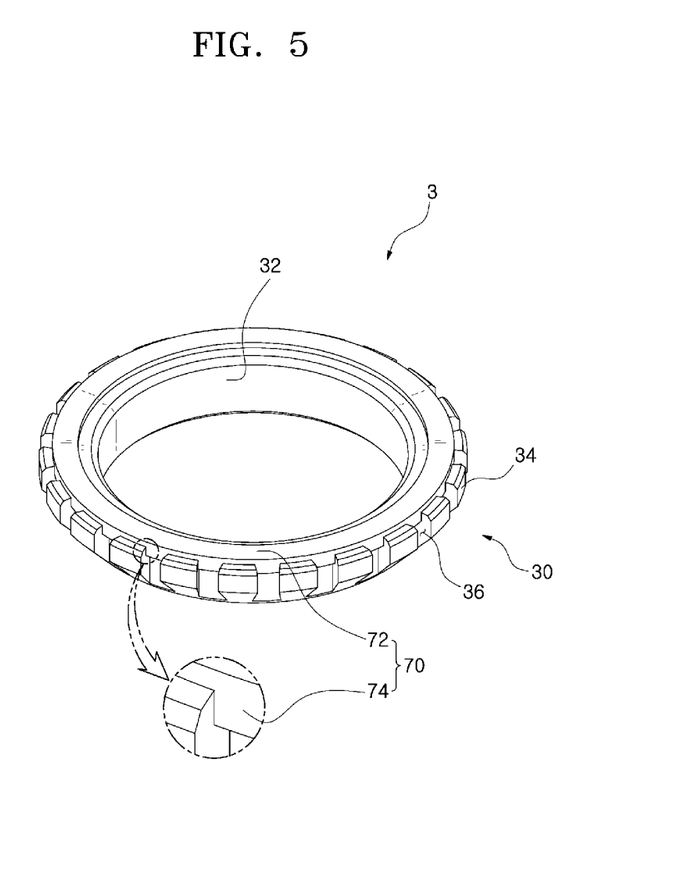
FIG. 5 is a perspective view schematically illustrating a main structure of an apparatus for measuring a speed of a vehicle having an in-wheel motor in accordance with another embodiment.

FIG. 5 is a perspective view schematically illustrating a main structure of an apparatus for measuring a speed of a vehicle having an in-wheel motor in accordance with another embodiment.

As illustrated in FIG. 5, the apparatus 3 for measuring a speed of a vehicle having an in-wheel motor in accordance with another embodiment includes a lock nut part 30 which is fixed to an outer portion of a rotation shaft 18 rotated by receiving power of an in-wheel motor 10 and restricts the movement of a bearing part 20 positioned outside the rotation shaft 18, a magnet part 70 which has a magnetic force and is fixed to the lock nut part 30, and a speed sensor part 60 which is installed to be separated from the magnet part 70 and measures the rotations of the magnet part 70.

The magnet part 70 is installed on the upper surface of the lock nut part 30 through bonding by magnet vulcanization. Since a steel member which is positioned between the magnet part 70 and the lock nut part 30 is removed, a production process may be simplified, and an application as a package may be easy.

In the apparatus 3 for measuring a speed of a vehicle having an in-wheel motor in accordance with another embodiment, a method is used in which the rubber magnet part 70 is bonded to the lock nut part 30 by applying vulcanization. Since the material of the lock nut part 30 is based on steel, an encoder may serve as a magnetic flux path of steel.

The lock nut part 30 includes a lock nut body 32 which is locked to the outer portion of the rotation shaft 18 and has a ring shape, outer projections 34 which project on the circumferential outer surface of the lock nut body 32 and define shapes of prominences and depressions, and engagement grooves 36 which form groove portions between the outer projections 34.

The magnet part 70 in accordance with another embodiment includes a magnet body 72 which faces the upper surface of the lock nut part 30 and extends in a ring shape, and engagement projections 74 which extend from the magnet body 72 and are inserted into the engagement grooves 36 which are defined in the lock nut part 30. Since the engagement projections 74 are engaged into the engagement grooves 36 of the lock nut part 30, the coupling force of the magnet part 70 and the lock nut part 30 may be increased.

Moreover, since the magnet part 70 is formed by sintering powder having a magnetic force and is bonded to the outside of the lock nut part 30, an assembling process may be simplified and the productivity may be improved.

Hereafter, an apparatus 5 for measuring a speed of a vehicle having an in-wheel motor in accordance with still another embodiment of the disclosure will be described with reference to drawings.

For the sake of convenience in explanation, the same reference numerals will be used for components of which constructions and functions are the same as those of the aforementioned embodiment, and detailed descriptions thereof will be omitted herein.

Figure 6:
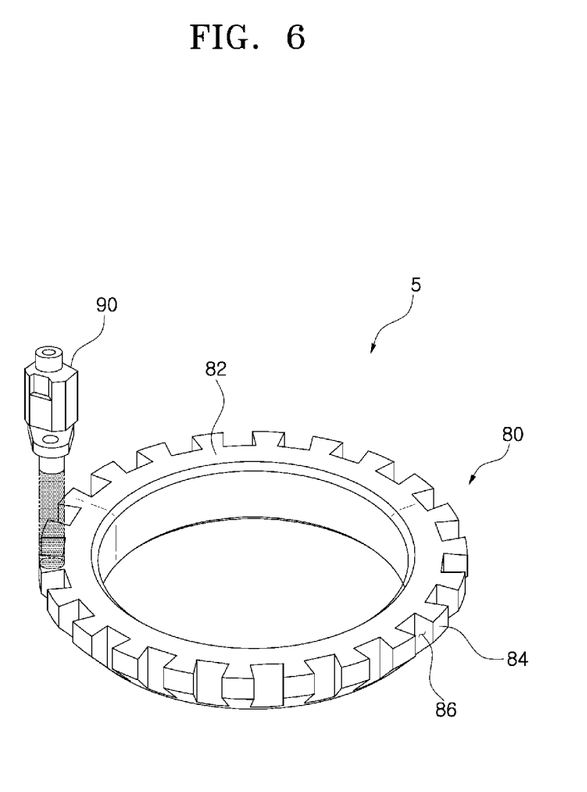
FIG. 6 is a perspective view schematically illustrating a main structure of an apparatus for measuring a speed of a vehicle having an in-wheel motor in accordance with still another embodiment.
Figure 7:
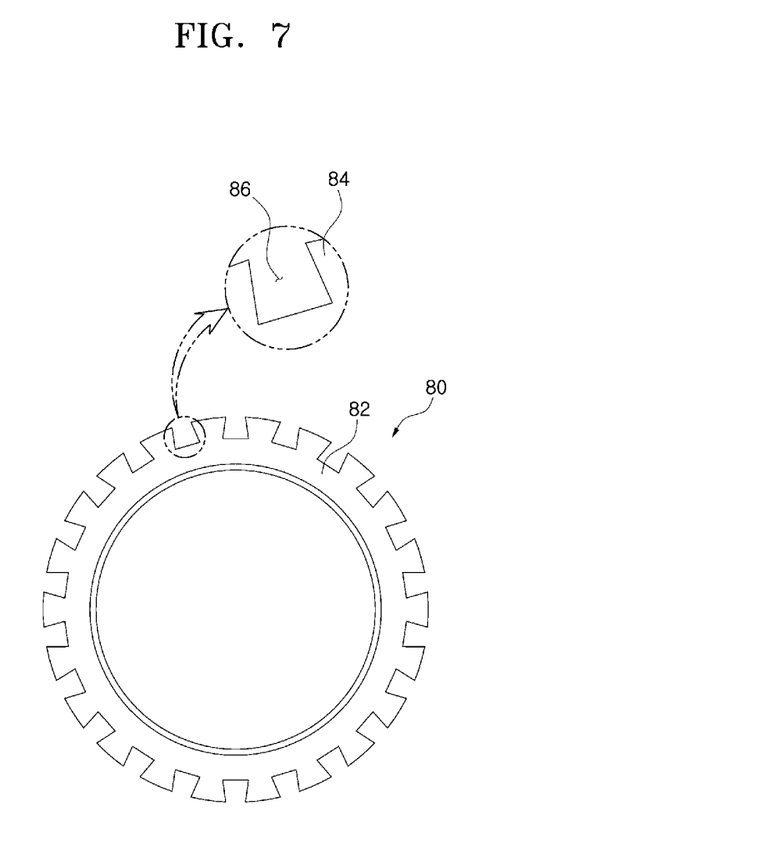
FIG. 7 is a perspective view illustrating a lock nut part in accordance with still another embodiment.

FIG. 6 is a perspective view schematically illustrating a main structure of an apparatus for measuring a speed of a vehicle having an in-wheel motor in accordance with still another embodiment, and FIG. 7 is a perspective view illustrating a lock nut part in accordance with still another embodiment.

As illustrated in FIGS. 6 and 7, in the apparatus 5 for measuring a speed of a vehicle having an in-wheel motor in accordance with still another embodiment, a speed sensor part 90 is installed at a position facing the outside of a lock nut part 80.

The lock nut part 80 which is rotated together with the rotation shaft 18 includes a lock nut body 82 which is locked to the outer portion of the rotation shaft 18 and has a ring shape, outer projections 84 which project on the circumferential outer surface of the lock nut body 82 and define shapes of prominences and depressions, and engagement grooves 86 which form groove portions between the outer projections 84.

The rotations of the rock nut part 80 are measured in a tone wheel style by using the rotation of the engagement grooves 86 as grooves defined on the circumferential outer surface of the lock nut part 80. An electromotive force is obtained through the electromagnetic induction function of the coil of the speed sensor part 90 which is installed adjacent to the lock nut part 80, and the rotations of the lock nut part 80 may be measured by using an rpm of the lock nut part 80 and the number of the outer projections 84 of the lock nut part 80.

Since the grooves formed on the circumferential outer surface of the lock nut part 80 have the same shape as the shape of the teeth of a gear, a difference in magnetic resistance is induced when the lock nut part 80 is rotated. The style in which a rotation speed is sensed by the presence or absence of a groove on the circumferential outer surface of the lock nut part 80 is similar to a tone wheel style using a hub bearing. Since measurement according to the tone wheel style is known in the art, detailed description thereof will be omitted herein.

Since the number of engagement grooves 86 defined on the circumferential outer surface of the lock nut part 80 may be significantly increased depending on a fabrication method, the role of a vehicle speed signal may be possible. Because the speed sensor part 90 senses a vehicle speed signal by the shapes of the engagement grooves 86 of the lock nut part 80, it is possible to remove the construction of an existing encoder and thereby shorten a production process.

As is apparent from the above descriptions, according to the embodiments, since the magnet parts 50 and 70 are installed on the lock nut part 30 which is rotated by receiving the power of the in-wheel motor 10, the position of a measurement part may be variously changed, whereby the degree of freedom of design may be increased. Also, in the embodiments, since a speed of a vehicle may be calculated by measuring rotations of the lock nut part 80 without using the separate magnet parts 50 and 70, the number of parts may be decreased, whereby the productivity may be improved.

Since the embodiments provide a structure in which a vehicle speed is sensed by utilizing the lock nut parts 30 and 80 installed to support the bearing part 20 coupled to the rotation shaft 18 of the in-wheel motor 10 or apply a preload, the construction of a package is easy when constructing an in-wheel driving device.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for measuring a speed of a vehicle having an in-wheel motor, comprising:
    a lock nut part fixed to an outer portion of a rotation shaft configured to be rotated by receiving power of the in-wheel motor, and restricting movement of a bearing part positioned outside the rotation shaft;
    a connection part coupled to the lock nut part;
    a magnet part having a magnetic force, and fixed to the connection part; and
    a speed sensor part installed to be separated from the magnet part, and configured for measuring rotations of the magnet part.

2. The apparatus according to claim 1, wherein the connection part has a ring shape which surrounds an outside of the lock nut part, and is configured to be coupled to the lock nut part by press fitting.

3. The apparatus according to claim 2, wherein the connection part is configured to be coupled to the lock nut part after the connection part and the magnet part are coupled first.

4. The apparatus according to claim 3, wherein the magnet part is formed by sintering powder having a magnetic force, and is bonded to the connection part.

5. An apparatus for measuring a speed of a vehicle having an in-wheel motor, comprising:
    a lock nut part fixed to an outer portion of a rotation shaft configured to be rotated by receiving power of the in-wheel motor, and restricting movement of a bearing part positioned outside the rotation shaft;
    a magnet part having a magnetic force, and fixed to the lock nut part; and
    a speed sensor part installed to be separated from the magnet part, and configured for measuring rotations of the magnet part.

6. The apparatus according to claim 5, wherein the magnet part is formed by sintering powder having a magnetic force, and is bonded to an outside of the lock nut part.

7. The apparatus according to claim 6, wherein the magnet part comprises:
    a magnet body facing an upper surface of the lock nut part, and extending in a ring shape; and
    engagement projections extending from the magnet body, and inserted into engagement grooves which are defined in the lock nut part.

8. An apparatus for measuring a speed of a vehicle having an in-wheel motor, comprising:
    a lock nut part fixed to an outer portion of a rotation shaft configured to be rotated by receiving power of the in-wheel motor, and restricting movement of a bearing part positioned outside the rotation shaft; and
    a speed sensor part installed to be separated from the lock nut part, and configured for measuring rotations of the lock nut part.

9. The apparatus according to claim 8, wherein the lock nut part comprises:
    a lock nut body locked to the outer portion of the rotation shaft, and having a ring shape; and
    outer projections projecting on a circumferential outer surface of the lock nut body in shapes of prominences and depressions, and configured to be measured by the speed sensor part.

10. The apparatus according to claim 9, wherein the lock nut part further comprises:
    engagement grooves which form groove portions between the outer projections.

* * * * *